United States Patent [19]

Harris

[11] 4,392,507

[45] Jul. 12, 1983

[54] TWO-STAGE PRESSURE RELIEF VALVE

[75] Inventor: Robert S. Harris, Connersville, Ind.

[73] Assignee: Stant Inc., Connersville, Ind.

[21] Appl. No.: 263,918

[22] Filed: May 15, 1981

[51] Int. Cl.³ .............................................. F16K 17/36
[52] U.S. Cl. .................................... 137/38; 137/512.3;
137/512.5
[58] Field of Search ................... 137/38, 512.3, 512.5

[56] References Cited

U.S. PATENT DOCUMENTS 4,005,724  2/1977  Courtot .................................. 137/38
4,340,084  7/1982  Snow ............................ 137/512.3 X

FOREIGN PATENT DOCUMENTS 895628  1/1945  France ............................. 137/512.3

Primary Examiner—Robert G. Nilson
Attorney, Agent, or Firm—Barnes & Thornburg

[57] ABSTRACT

A two-stage valve adapted for use in downward flow in the fuel line of a vehicle to provide roll-over protection, comprising a housing having two ball check valves axially disposed to normally check upward flow, the lower ball being expansion-biased spring-loaded, the upper ball being loaded with an expansion-biased spring resting upon the lower ball, the lower ball being larger than the upper ball, and the upper spring having a lower spring force than the lower spring.

3 Claims, 2 Drawing Figures

TWO-STAGE PRESSURE RELIEF VALVE

This invention relates to safety valves for vehicle fuel systems. More particularly, it relates to a valve system for a vehicle fuel line which permits fuel flow to the carburetor or fuel injection system under normal conditions, but shuts off such flow in the event of vehicle roll-over, thereby reducing the danger from fire. Thus, unlike a conventional check valve which serves only to prevent reverse flow, the valve system of the present invention automatically stops the forward flow of fuel in the event of vehicle roll-over.

Numerous kinds of safety valves are known to the art. U.S. Pat. No. 1,893,942, Jensen, for example, describes a pressure relief valve for tanks or volatile liquids which is adapted to close in case of tank inversion to prevent the escape of liquid from the vapor vent line. The Jensen device, however, uses two independently acting ball valves, one spring-activated and the other gravity-activated, each serving a different function from the other.

U.S. Pat. No. 3,387,623, Essig, describes a pressure check-valve structure allowing flow at varying rates in both directions, employing a diaphragm with one fixed seat and one movable seat, with one compression-biased spring and one expansion-biased spring.

U.S. Pat. No. 1,933,753, Parsons, describes a diaphragm-operated valve for supplying fuel to the carburetor of a vehicle at substantially constant predetermined pressure regardless of the degree of inclination of the vehicle. As in one embodiment of the present invention, the Parsons device includes means for returning excess fuel to the fuel tank.

U.S. Pat. No. 3,738,384, Hall, describes a valve for a fuel tank venting system for motor vehicles which provides for fuel shut-off from the vent line during vehicle roll-over. The Hall device employs a ball float valve, the weight of which presses against a spring-biased plunger, thereby preventing vapor flow. During roll-over, the ball rolls away from the plunger, allowing the spring to close the upper valve means against liquid loss.

The present invention provides a relatively simple two-stage valve adapted for use in a vehicle fuel line to provide protection against discharge of fuel during roll-over, thereby minimizing fire hazard. In one modification, the valve also provides means for returning excess fuel to the fuel tank during normal operation, thereby avoiding undesirable pressure buildup, leaks, fire hazards, and damage to the fuel pump.

Other objects of the invention will be apparent from the following description.

Figure 1:
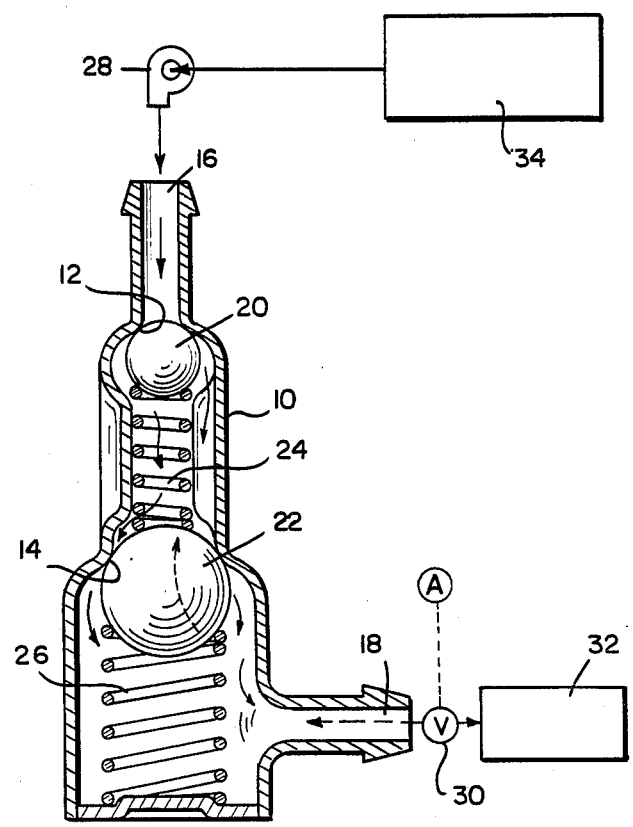
FIG. 1 is a view, partially in section, of a two-stage valve designed for installation in the fuel line of a vehicle between the fuel pump and the carburetor or fuel injection system.

Referring now to the drawings, FIG. 1 shows a two-stage pressure relief valve comprising a housing 10 defining a fuel passageway having a valve seat 12 and a valve seat 14 between the entry end 16 and the exit end 18 of the passageway. A ball 20 closes against seat 12 and another ball 22 closes against seat 14, in both cases against the normal direction of liquid flow within the valve. An expansion-biased spring 24 is disposed between the balls 20 and 22 to hold the ball 20 yieldably against the seat 12. An expansion-biased spring 26 yieldably holds ball 22 against seat 14. The entry end 16 is connected to the fuel pump 28, and the exit end 18 is connected through accelerator 30 to the carburetor or fuel injection system 32.

As illustrated, ball 20 is smaller than ball 22. Springs 24 and 26 are chosen to have sufficient spring force to seat balls 20 and 22 in the absence of fluid flow when the valve is in an upright position (i.e., with entry end 16 at the top and the long axis of the valve vertical), and spring 24 is chosen to have a lower spring force than spring 26. As a result, in order for fuel to enter through entry end 16 at a sufficient pressure to overcome the resistance to flow in the accelerator 30 and the carburetor/fuel injector 32, it must move ball 20 away from its seat 12 and load spring 24. This will permit fuel to pass through the passageway around ball 20 and place on ball 22 the same pressure previously on ball 20. Since ball 22 has a larger area than ball 20, that same pressure, operating upon the greater area of ball 22, will exert a force which, when combined with the force of spring 24 (now compressed), will be sufficient to move ball 22 off its seat 14 and allow fuel to flow from the entry end 16 to the exit end 18.

Back flow, of course, is stopped by the one-way action of balls 22 and 20. Forward flow (from entry end 16 through exit end 18) can be maintained at an operating pressure lower than the initial pressure required to unseat ball 20 because, once ball 22 is unseated, the spring force from spring 24 tending to close ball 20 upon seat 12 is smaller because ball 22 is displaced downwardly as shown in FIG. 1. The operation of the entire device depends, in principle, upon having spring 24 resting upon ball 22, so that, when ball 22 moves away from its seat, there is a smaller spring pressure working on ball 20, which then remains open even at fuel pressures lower than the initial pressure.

The primary purpose of the valve of FIG. 1 is to provide protection against fire in case the vehicle rolls over, by preventing fuel from draining out of the fuel tank to the carburetor. This protection is provided during roll-over by closure of ball 20 against seat 12 by action of gravity and springs 24 and 26. Protection of a different kind is provided during normal operation of the vehicle. Substantial pressure is normally required to move ball 20 away from seat 12; but once that ball moves away from its seat, a significantly lower pressure can hold ball 22 away from its seat 14 because of its larger area. This reduction in fuel pressure requirements gives protection against fuel pump pressure loss at high speed and also protection against vapor lock conditions.

In a typical embodiment of the device of FIG. 1, the upper (smaller) ball 20 has a diameter of $\frac{3}{8}$ inch (0.9525 cm) and has a seat area when closed of 165 square millimeters. The lower (larger) ball 22 has a diameter of $\frac{5}{8}$ inch (1.5875 cm) and has a seat area when closed of 572 square millimeters. Spring 24 exerts 105 grams minimum force and 175 grams maximum force when the two balls are seated. Spring 26 exerts 200 grams minimum force and 300 grams maximum force when the two balls are seated. The unit is designed to seal at 7.9 kilopascals (kPa) pressure and to open at 17.7 kPa. When ball 20 opens, ball 22 will also open, and the total valve assembly will remain open until the pressure drops below 4.6 kPa minimum or 6.9 kPa maximum.

Figure 2:
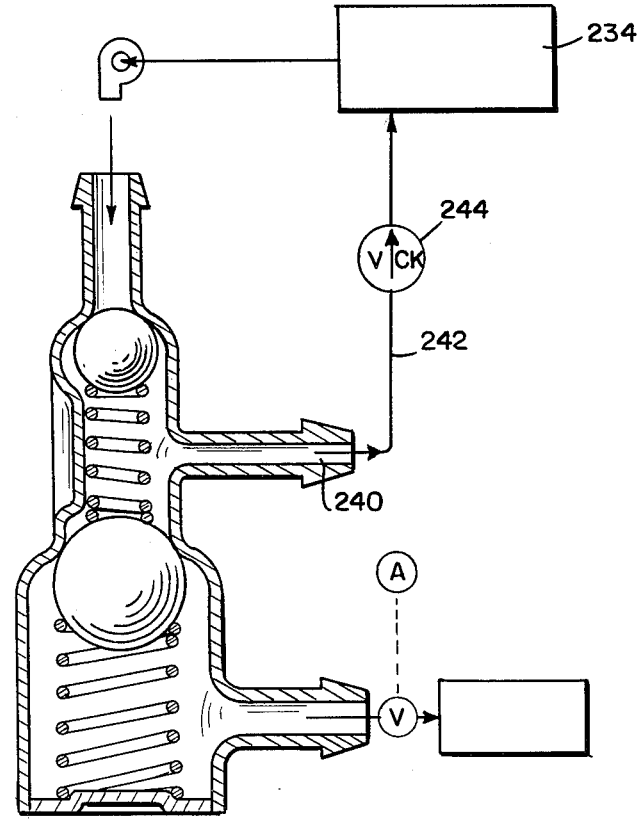
FIG. 2 is a view, partially in section, of a device similar to FIG. 1 with the addition of an extra outlet for the return of excess fuel to the fuel tank.

FIG. 2 illustrates another embodiment of the invention similar to FIG. 1 except that an extra outlet, indicated at 240, is provided for return of excess fuel to the fuel tank 234 through tube 242, in which check valve 244 is installed to prevent reverse flow. "Excess fuel" is fuel supplied by the fuel pump over and above that amount allowed to enter the carburetor or the fuel injection system. Check valve 244 is adjustably spring-loaded to allow forward flow only at pressures above the normal pressure of fuel entering the carburetor or the fuel injections system. The system of FIG. 2, allowing return of excess fuel to the fuel tank while preventing drainback of the fuel in a roll-over situation, is useful primarily in systems having a positive displacement fuel pump, especially an electrically operated positive displacement fuel pump, which could continue to operate after roll-over, even after the engine stops running.

Figure 3:
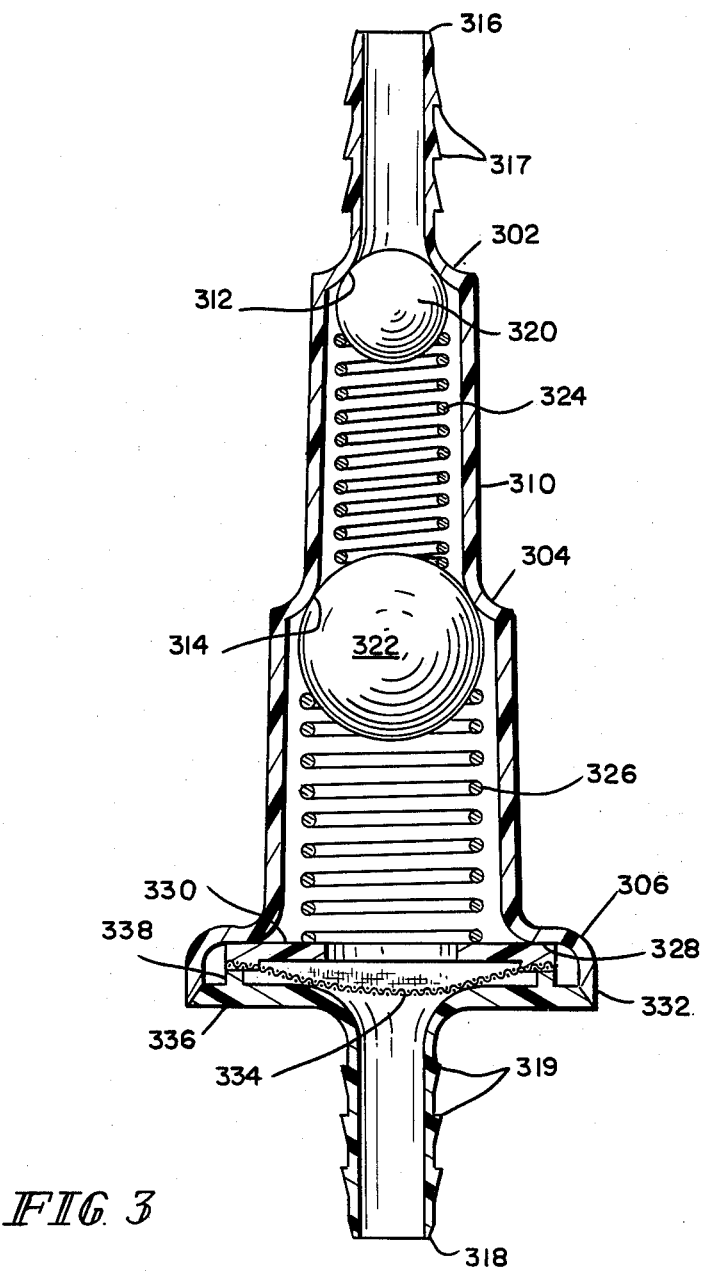
FIG. 3 is a view, partially in section, of a plastic two-stage valve with screen designed for installation in the fuel line of a vehicle between the fuel pump and the carburetor or fuel injection system.

FIG. 3 illustrates a two-stage pressure-relief valve generally of the type shown in FIG. 1, with an added screen. The valve comprises a housing 310 made of nylon, a thermoplastic polymer, defining an elongated passageway which increases stepwise in diameter at three flare points 302, 304, and 306 from the inlet end 316 to the outlet end 318. The first flare point 302 internally defines a first valve seat 312, and the second flare point 304 internally defines a second valve seat 314, larger than the first valve seat 312, both valve seats facing downstream, i.e., in the direction of normal fluid flow in the valve toward the outlet end 318. The third flare point 306 provides an internal shoulder 328, and terminates in skirt 332. The inlet 316 and the outlet 318 are provided with nipples having one or more corrugations or barbs 317 and 319 for attachment of a tube or hose.

Within the housing 310 is located a neoprene ball 320 closing against seat 312 and a larger neoprene ball 322 closing against seat 314, in both cases against the normal direction of liquid flow within the valve. A compression spring 324 is disposed between the two balls to hold ball 320 yieldably against seat 312. A second compression spring 326, supported on ring 330 resting against shoulder 328, yieldably holds ball 322 against seat 314. The spring sizes are chosen as described for FIG. 1.

An arcuate stainless steel screen 334 is fitted to the downstream side of ring 330, extending to its edge, and with the convex side of the screen facing downstream. Into the opening formed by skirt 332 is inserted flange member 336 bearing annular shoulder 338 on its upstream side and exit member 318 on its downstream side. Shoulder 338 is sized so that, when the flange 336 member is inserted into housing 310, shoulder 338 supports screen 334 against ring 330, and flange 336 fits snugly against the bottom of skirt 332, e.g., with mitred edges as illustrated. The assembly is then subjected to suitable treatment (e.g., by ultrasonic welding) to heat-stake screen 334 in place between shoulder 338 and ring 330 and to unite the abutting edges of flange 336 and skirt 332.

What is claimed is:

1. A two-stage valve adapted for use in a vehicle fuel line to provide protection against discharge of fuel during and after roll-over, comprising a housing with inlet and outlet openings in the upper and lower portions of the housing as disposed for normal operation, two axially disposed ball check valves within the housing having their seats facing in the direction of the outlet opening, the lower ball being loaded upward toward its seat with an expansion-biased spring, the upper ball being loaded upward toward its seat by an expansion-biased spring resting upon the lower ball, the lower ball being larger than the upper ball and the upper spring having a lower spring force than the lower spring.

2. A valve as in claim 1 having a discharge line for excess liquid in the side of the housing between the two ball check valves.

3. A valve for connection in a vehicle fuel line between a fuel tank and the carburetor or fuel injector comprising a housing defining an elongated valve passageway having an upper portion and a lower portion, an inlet end in the upper portion providing means for coupling the housing to the fuel tank, a first valve seat in the upper portion, a second valve seat in the lower portion of larger diameter than the first valve seat, and an outlet end in the lower portion providing means for coupling the housing to the carburetor or fuel injector, the first and second valve seats being serially arranged in the passageway with each seat facing the outlet end, a first ball for engaging and closing the first valve seat and a second larger ball for engaging and closing the larger valve seat, a compression spring for yieldably urging the larger ball against the larger seat, and a weaker compression spring for yieldably urging the smaller ball against the smaller seat, said last spring resting against the larger ball, the springs, when the housing is upright, yielding in response to fuel pressure on the first ball to open the passageway, and the springs, when the housing is inverted, urging both balls against the seats to close the passageway.

* * * * *